No. 676,430. Patented June 18, 1901.
G. J. GIBBENS.
PORTABLE DERRICK FRAME.
(Application filed Mar. 26, 1901.)
(No Model.) 2 Sheets—Sheet 2.

Witnesses  G. J. Gibbens, Inventor

UNITED STATES PATENT OFFICE.

GABRIEL J. GIBBENS, OF COATS, KANSAS.

PORTABLE DERRICK-FRAME.

SPECIFICATION forming part of Letters Patent No. 676,430, dated June 18, 1901.

Application filed March 26, 1901. Serial No. 52,995. (No model.)

*To all whom it may concern:*

Be it known that I, GABRIEL J. GIBBENS, a citizen of the United States, residing at Coats, in the county of Pratt and State of Kansas, have invented a new and useful Portable Derrick-Frame, of which the following is a specification.

My invention is an improved portable derrick-frame for stacking or ricking hay, straw, or headed wheat; and it consists in the peculiar construction and combination of devices hereinafter fully set forth and claimed.

Figure 1:
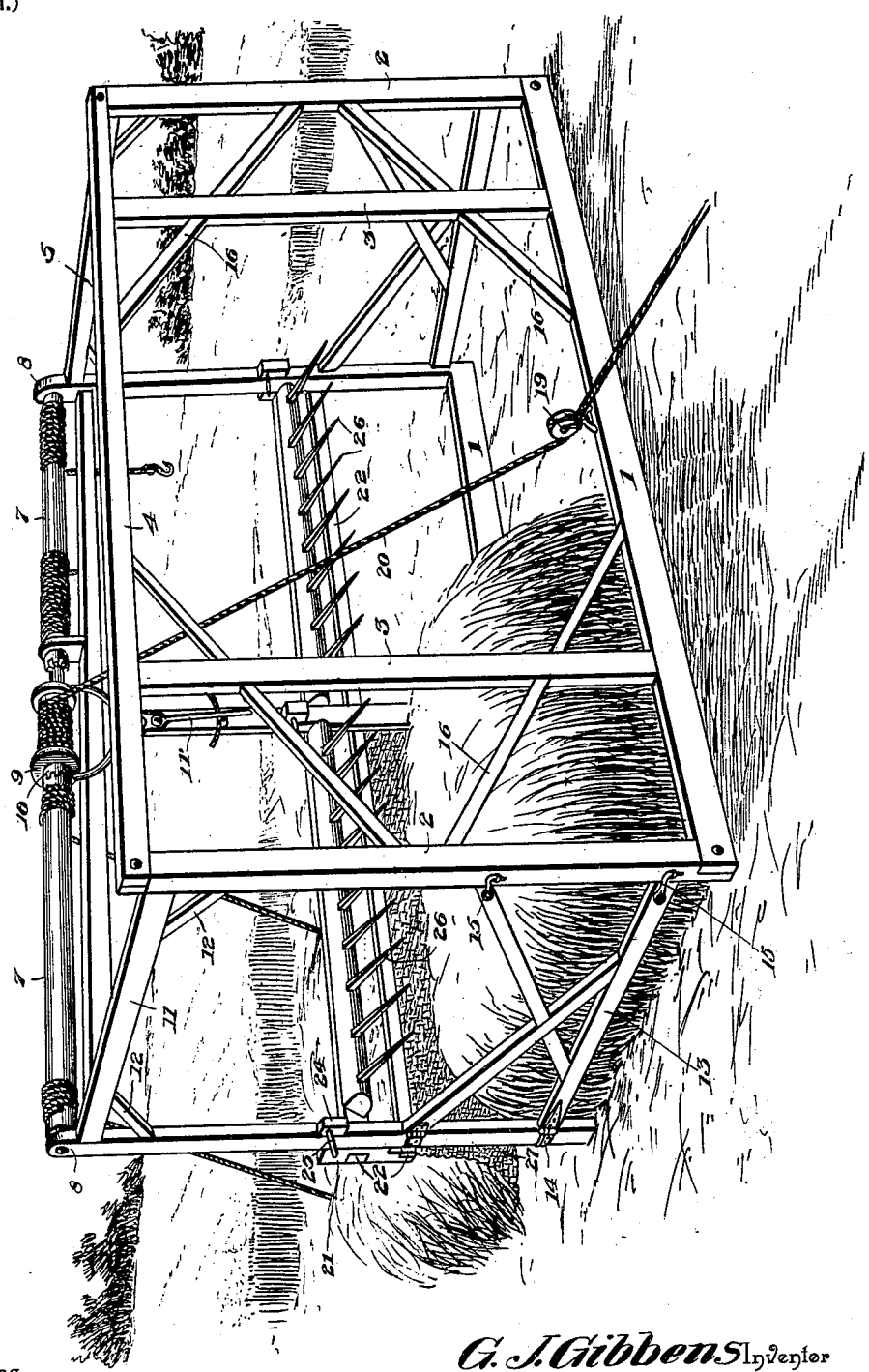
Figures 2, 3:
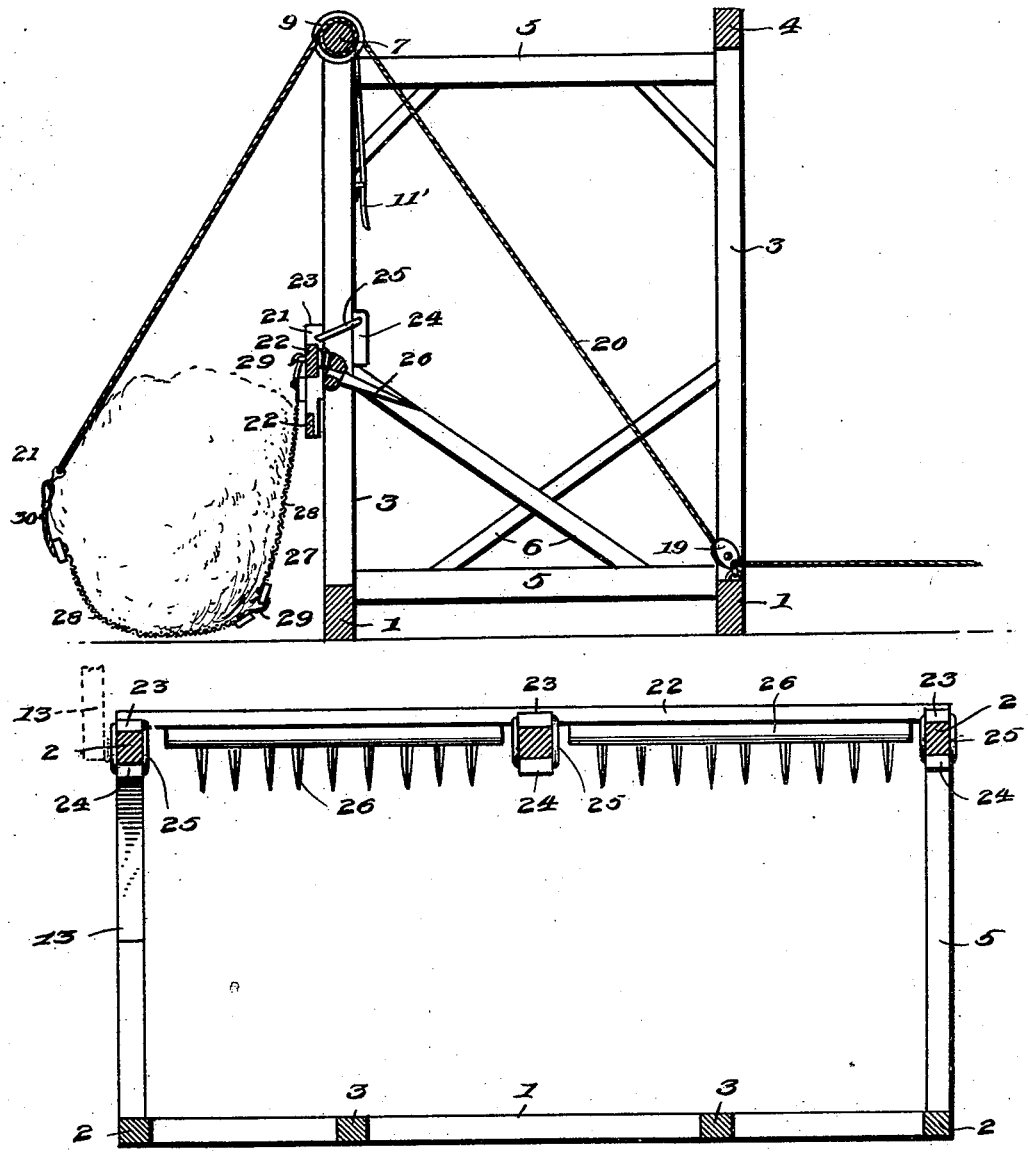

In the accompanying drawings, Figure 1 is a perspective view of my improved portable derrick-frame, showing the same in operative position. Fig. 2 is a vertical transverse sectional view of the same. Fig. 3 is a horizontal sectional view of the same.

The sides of my improved portable derrick-frame are formed by the sills 1, which are adapted to slide on the ground, the corner-posts 2, the studs 3, and plates 4. The space between the sides at one end of the frame is closed by horizontally-disposed cross-beams 5 and inclined cross-bars 6. The rear end of the frame is closed at its upper side by a cross-beam 11 and braces 12. A gate 13 at the rear end of the frame is hinged to the corner-post on one side thereof, as at 14, and is provided with hooks or other suitable devices 15 to secure the said gate in a closed position, as shown in Fig. 1. The said gate may be either of the form here shown or of any other suitable construction. The sides of the frame are provided with suitable braces 16.

A pair of longitudinally-disposed roller-drums 7 are journaled in suitable bearings 8 on one of the plates 4. Said roller-drums are independently revoluble, and each has on its inner end a clutch member 8. A drum 9 is shiftable between the proximate ends of the said roller-drums and has at its ends clutch members 10. Hence said drum 9 may be locked to either of said roller-drums 7. Any suitable means may be employed to thus shift and clutch the drum 9. I here show a shifting-lever 11' for this purpose.

A suitable block 19 is attached to the sill 1 on one side of the frame, and a hoisting-rope 20 is rove through the block 19 and attached to the shiftable drum 9.

A rack 21 is disposed on one side of the frame and is adapted to be raised and lowered thereon. The said rack in the form of my invention here shown comprises a pair of longitudinal bars 22, connected together at their ends and centers by vertical bars 23. The latter bear against the posts 2 and central stud 3 of one side of the frame and are secured thereon at any desired vertical adjustment by friction-blocks 24 and links 25, the latter being preferably formed of pieces of rope looped as shown; but any suitable form of links may be employed to connect the friction-blocks to the bars 23.

It will be observed by reference to the drawings that the friction-blocks 24 and bars 23 are on opposite sides of the posts and studs of one side of the frame and that the length of the links 25 is such as to dispose the bars 23 slightly below the upper ends of the friction-blocks, and thereby the latter are rendered efficient to maintain the rack at any desired adjustment and adapt the rack to be readily raised and lowered.

On the inner side of the adjustable rack are pivoted or hinged guide-forks 26, the fingers of which extend inwardly over the space between the sides of the frame and are normally inclined downwardly, as shown in Figs. 1 and 2. A sling 27, which is here shown as a net formed in detachable sections 28, is detachably connected at one end to the adjustable rack, as by hooks and staples 29 or other suitable devices, and to the outer end of said sling are hooked the hoisting-ropes 21 of one of said roller-drums. Said ropes are wound on said drums in the reverse direction to the rope 20 on shiftable drum 9.

In the operation of my improved portable derrick-frame the grain, hay, or straw is thrown onto the sling, the ropes 21 of one of the roller-drums are attached thereto, the shiftable drum is clutched to said roller-drum, and by means of the rope 20 said shiftable drum and the roller-drum are rotated, thus causing the ropes 21 to be wound on the roller-drum and hoist the free end of the loaded sling, thereby causing the load to roll therefrom over the rack and one of the guide-forks onto the stack or rick. From time to time as the stack or rick increases in height the rack is raised accordingly on the side of the derrick-frame. In forming a rick the same is formed first in one end of the frame, and the sling and hoisting-tackle are then adjusted to the other end of the frame and the rick formed therein, and the gate 13 being then opened the frame may be drawn forward to clear the rick and the operation before described repeated, hence enabling the rick to be formed of any desired length.

Having thus described my invention, I claim—

1. A portable derrick-frame of the class described, having an adjustable element on one side thereof adapted to be raised and lowered, a sling connected to said adjustable element and a hoisting-tackle adapted to be connected to said sling, substantially as described.

2. A frame of the class described having vertical side members, an adjustable element thereon adapted to be raised and lowered, friction-blocks engaging said vertical side members on the side opposite said adjustable element, and links connecting said friction-blocks and said adjustable element, in combination with a sling adapted to be attached to said adjustable element, and a hoisting-tackle adapted to be attached to said sling, substantially as described.

3. A portable derrick-frame of the class described, in combination with a vertically-adjustable rack on one side of the frame, a sling adapted to be attached to said rack, a drum on said frame, a rope attached to said drum and adapted to be attached to said sling, and means to rotate said drum, substantially as described.

4. A portable derrick-frame of the class described having a vertically-adjustable element on one side thereof and a guide-fork (one or more) carried by said vertically-adjustable element, substantially as described.

5. A derrick-frame of the class described, in combination with longitudinally-disposed drums thereon, a shiftable drum adapted to be clutched to either of said drums at will, a rope on said shiftable drum, a sling, means to attach the same to said derrick-frame and adapt said sling to be shifted longitudinally thereon, and hoisting-ropes on said longitudinally-disposed drums and adapted to be attached to said sling, to elevate the free end of the latter, for the purpose set forth, substantially as described.

In testimony that I claim the foregoing as my own I have hereto affixed my signature in the presence of two witnesses.

GABRIEL J. GIBBENS.

Witnesses:
B. A. JONES,
W. W. HARRIS.